Nov. 29, 1932.  G. INNES  1,889,443
GRAIN SAVER
Original Filed Feb. 24, 1927  5 Sheets-Sheet 3
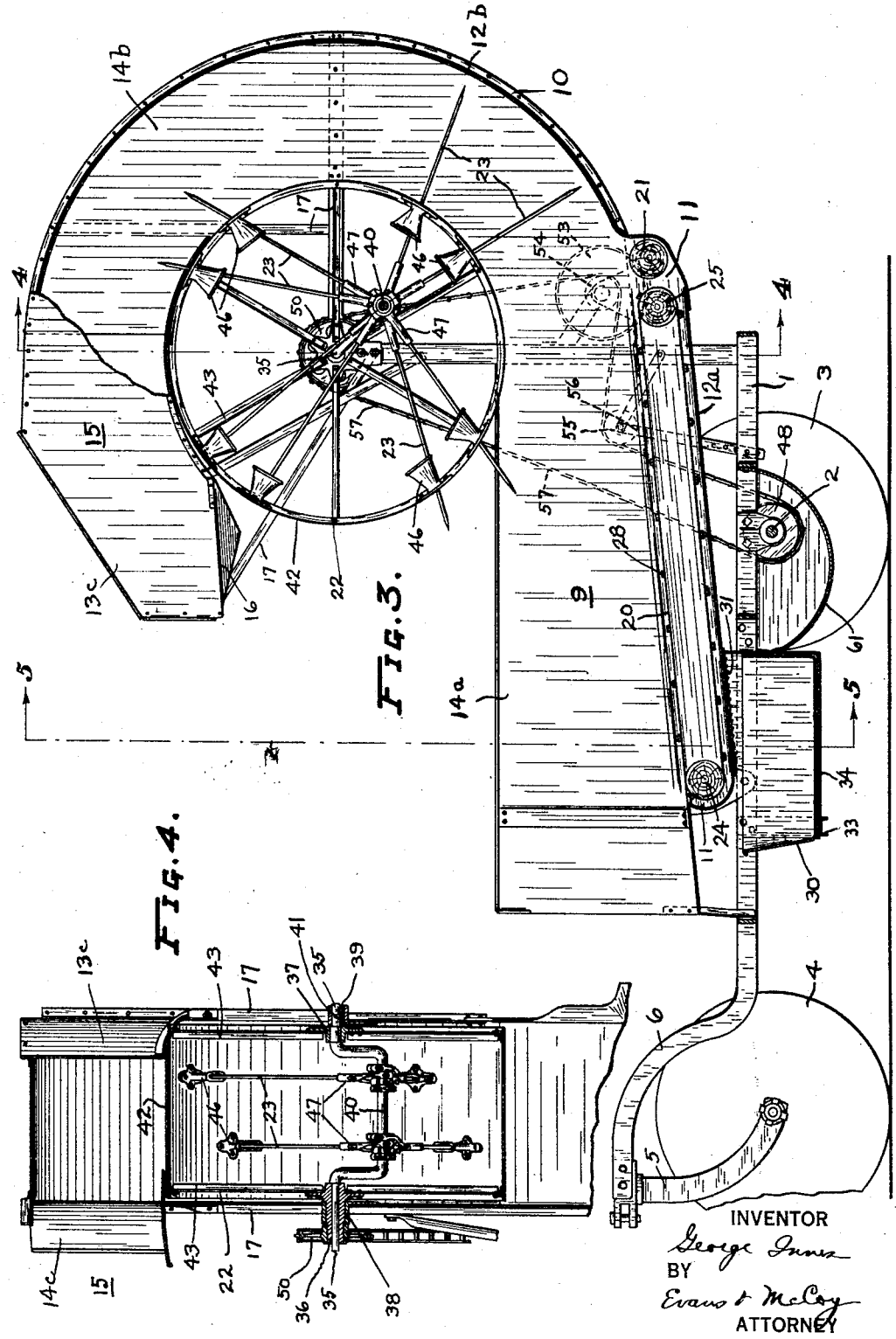

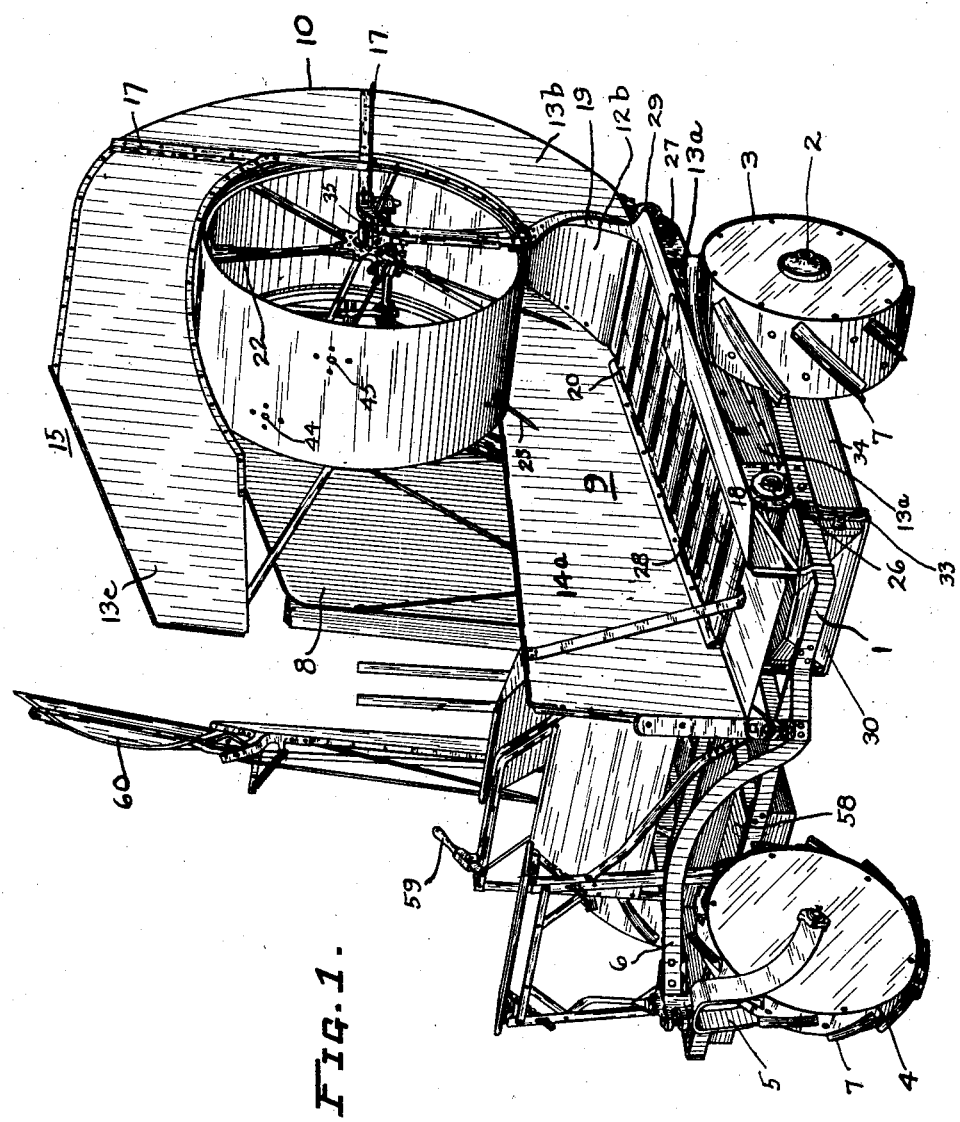

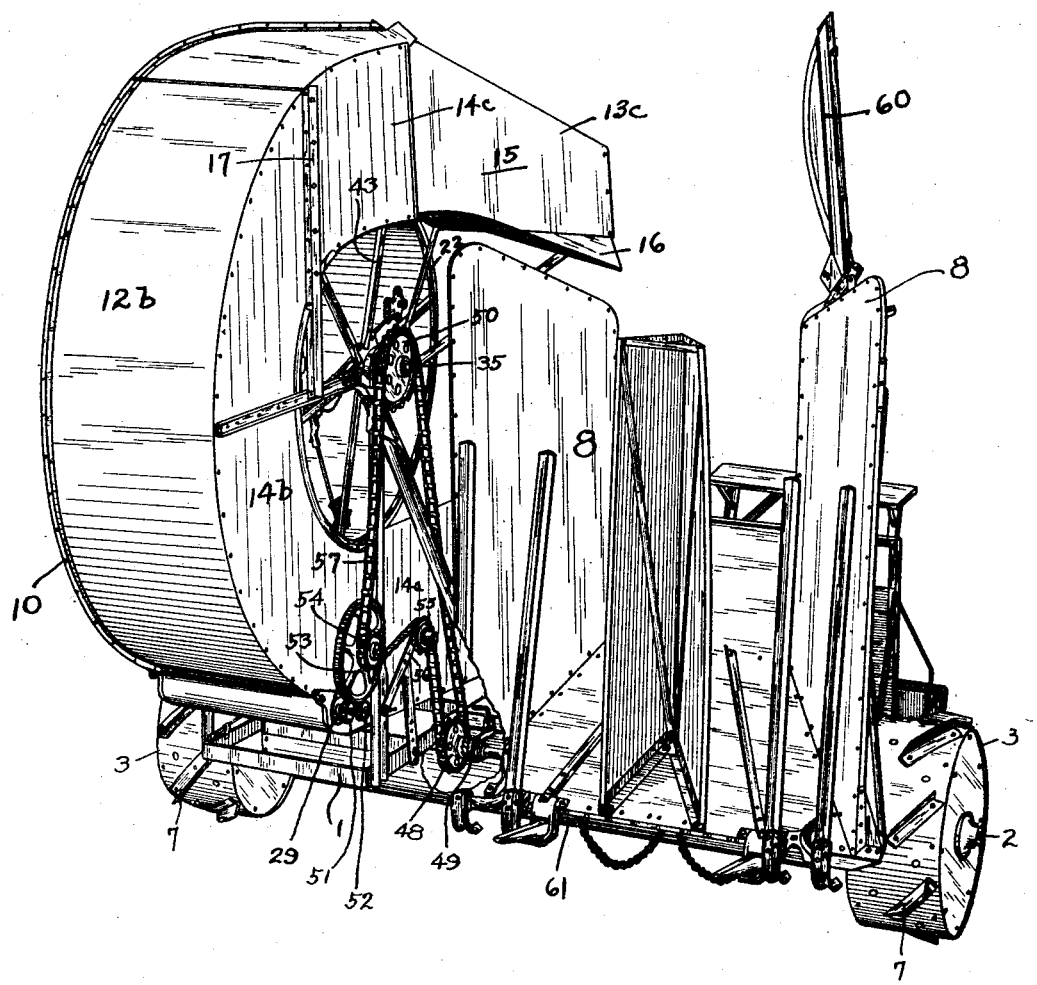

Nov. 29, 1932.  G. INNES  1,889,443
GRAIN SAVER
Original Filed Feb. 24, 1927   5 Sheets-Sheet 4

INVENTOR
George Innes
BY
Evans & McCoy
ATTORNEY

Nov. 29, 1932.  G. INNES  1,889,443
GRAIN SAVER
Original Filed Feb. 24, 1927   5 Sheets-Sheet 5

INVENTOR
George Innes
BY
Evans & McCoy
ATTORNEY

Patented Nov. 29, 1932

1,889,443

UNITED STATES PATENT OFFICE

GEORGE INNES, OF DAVENPORT, IOWA, ASSIGNOR TO INNES MANUFACTURING COMPANY, OF BETTENDORF, IOWA, A CORPORATION OF DELAWARE

GRAIN SAVER

Application filed February 24, 1927, Serial No. 170,526. Renewed December 18, 1929.

This invention relates to machines for shocking grain received from a binder and more particularly to mechanism for automatically conveying grain from a binder to a shocker basket and for recovering grain particles.

This invention relates to mechanism for the same general purposes as the mechanism disclosed in my copending application Serial No. 116,548 filed June 17, 1926.

In this specification and in the appended claims the term "grain stalks" will refer to stalks having heads attached thereto and "grain particles" will refer to individual grains or heads of grain or parts thereof unattached to stalks or having but very short stalks attached thereto.

In the past, while various methods and means have been employed for transferring bundles of grain from a binder to a shocker basket, loose grain stalks and grain particles accumulating in the binder and upon the binder deck have been ordinarily unrecovered, resulting in a very appreciable economic loss. Furthermore, any grain particles loosened from the grain bundles during the conveyance thereof from the binder deck to the shocker basket have ordinarily been lost.

An object of my invention is to provide an advantageous and compact mechanism for conveying bundles of grain and grain stalks from a binder to a shocker basket.

Another object of this invention is to provide means for recovering grain particles, and disposing such particles in a suitable container.

Another object of the invention is to provide a substantially grain-tight mechanism for conveying grain bundles from a binder to a shocker basket.

A further object of the invention is to provide means for receiving grain bundles, grain stalks and particles from a binder deck, delivering said bundles and stalks to a shocker basket, and collecting said grain particles and disposing them in a suitable container.

Another object of my invention is to provide a simple and compact conveying mechanism by which the grain bundles are turned end for end during their passage from the binder to the shocker basket.

A further object of the invention is to provide grain bundle transferring mechanism including a casing or housing arranged to retain grain particles.

Another object of the invention is to provide grain bundle transferring mechanism having means to direct grain bundles from a position laterally of a shocker basket toward said basket.

In the drawings:

Figure 1 is a perspective view of a mechanism according to my invention disposed in cooperative relation to and on the same frame as a grain shocker;

Fig. 2 is a rear perspective view of the grain shocker and my improved mechanism;

Fig. 3 is a longitudinal vertical section through my improved mechanism;

Fig. 4 is a fragmentary vertical section taken on line 4—4 of Fig. 3;

Figure 7:
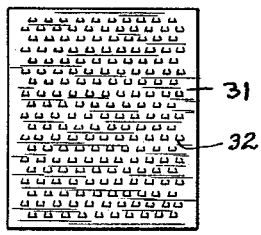
Fig. 7 is a plan view of the screen or riddle through which grain particles pass to the grain receiving receptacle.

My improved mechanism, which may be termed a "grain saver" is shown as mounted on the same frame as a grain shocker to form what may be termed a "shocker-saver".

While the grain shocker illustrated in the drawings is substantially similar in general characteristics to those shown in my U. S. Patents Nos. 1,512,768 and 1,512,769, it will be understood that the mechanism of my present invention may be employed with various types and forms of shockers.

With respect to the harvesting machinery, my improved mechanism or grain saver is arranged to be disposed laterally of and intermediate the deck of a binder and a shocker basket in substantially the same relative position and manner as indicated in Fig. 4 of my hereinbefore mentioned copending application Serial No. 116,548. The grain saver receives from the binder deck not only the assembled grain in the form of bundles but also grain particles and grain stalks. Due to the usual construction of binders, the grain saver receives the bundles with the butts thereof facing forwardly of the direction of movement of the harvesting machinery. My improved mechanism reverses the position of the bundles and delivers them adjacent the shocker basket with the butt ends facing rearwardly. Grain particles received from the binder deck as well as loosened from the bundles are conveyed to a suitable container which, for convenience, is preferably removable.

Referring to the accompanying drawings, the shocker-saver, comprising a shocker and my improved mechanism, is shown as mounted on a suitable frame 1 provided adjacent its rear end with the transverse axle 2, to the opposite ends of which are affixed the rear wheels 3. At the front end of the frame 1 is provided a single centrally disposed wheel 4 mounted in a fork 5 swiveled at its upper end in the upwardly arched forwardly projecting portion 6 of the frame 1. Where harvesting is to be done in rice fields, the rims of the wheels 3 and 4 are preferably relatively wide, the side faces of said wheels are preferably sheathed, and the rear axle 2 is preferably enclosed, as shown in the drawings at 61, in order to more readily negotiate wet and soft ground encountered in rice harvesting, and to protect the enclosed parts. The wheels moreover may be provided with traction cleats 7. For the harvesting of wheat or similar grains, however, the wheel rims may be narrower than shown in the drawings, the wheel side faces may be unsheathed, and the rear axle may be unenclosed. The traction cleats 7 may also in certain cases be omitted.

Mounted upon the frame 1 at one side thereof is a shocker basket 8 and associated mechanism to receive and retain a suitable number of bundles and to dispose the collected bundles in a shock upon the ground, said basket and mechanism being preferably of the type shown and disclosed in my hereinbefore mentioned U. S. Patents Nos. 1,512,768 and 1,512,769. On the opposite side of the frame there is mounted the mechanism for receiving the bundles discharged from a binder and for delivering said bundles to the shocker basket.

The grain saver is shown as comprising an open-top sheet metal grain-tight receptacle indicated generally at 9, with which is associated an arcuate upwardly extending portion or housing 10, which receptacle 9 and housing 10 may preferably be integral. The receptacle 9 and housing 10 are preferably in aligned position. The receptacle 9 has a depressed portion forming a conveyor pocket 11 and has a bottom 12a, outer side wall 13a and inner side wall 14a. The housing 10 is shown as constructed of sheet metal and as having an outer wall 12b, and side walls 13b and 14b, the outer wall 12b and inner side walls 13b and 14b being shown as forming continuations of the bottom 12a and walls 13a and 14a respectively, of the receptacle 9. At the upper end of the housing 10 is provided a lateral discharge portion 15 arranged to discharge grain bundles laterally toward the shocker basket. The said portion 15 is shown as comprising the angularly disposed side wall members 13c and 14c and the base member 16, the outer side wall 13c being shown as of relatively long extent.

A framework 17 extending upwardly from the frame 1 is arranged to support the housing 10 and discharge portion 15 in rigid manner.

The outer wall 13a of the receptacle 9 is provided with a substantially horizontal outwardly extending shelf 18, and adjacent the outer wall 13a of the housing 10 and forming a continuation of the shelf 18 is a forwardly inclined guide rib 19, the shelf 18 and rib 19 being arranged to assist in guiding bundles into the receptacle 9 and into the housing 10.

To convey grain bundles from the receptacle 9 to the discharge portion 15, I have provided advantageous and simple conveying means comprising an endless belt 20, a roller 21, a rotatable wheel 22, and pins 23 movable through the rim of the wheel 22 to cooperate with the bundles being conveyed.

The endless conveying belt 20 is of substantially the same width as the receptacle 9 and runs over rollers 24 and 25 adjacent the front and rear ends respectively of the pocket 11. The rollers 24 and 25 are journaled in suitable bearing members 26 and 27 secured to the side walls 13a and 14a. The belt 20 is preferably of canvas provided with wooden cleats 28, which cleats cooperate with the grain to convey the same. The belt is driven in such direction that the top surface thereof will move rearwardly toward the housing 10 whereby to convey bundles over the roller 21 and into the housing 10. The roller 21 is journaled in bearing members 29 secured to the side walls 13a and 14a and rotates in the same direction as the roller 21 and belt 20. In certain cases the roller 21 may be omitted from the construction, using merely the belt 20 to convey grain bundles into the housing 10. The driving means for actuating the belt 20 and roller 21 will be described hereinafter.

Figure 8:
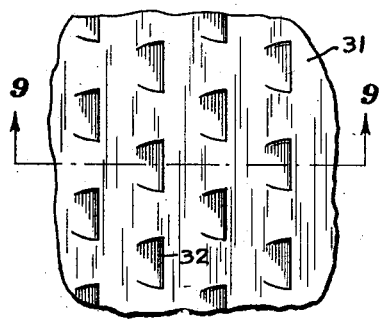
Fig. 8 is an enlarged fragmentary plan view of a portion of the screen.
Figure 9:
Fig. 9 is a fragmentary transverse section taken on line 9—9 of Fig. 8.
Figure 5:
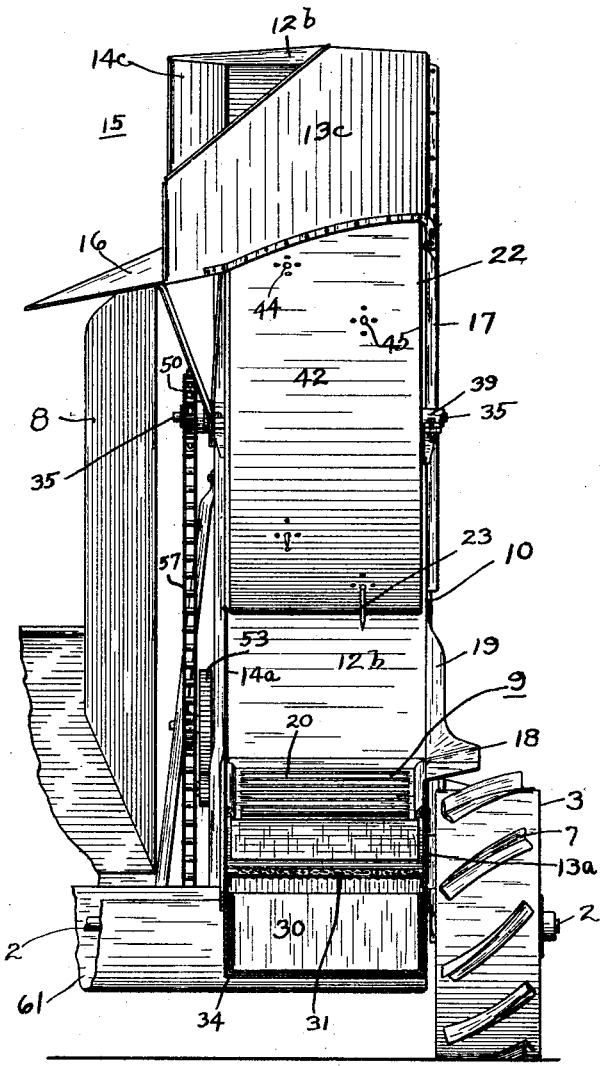
Fig. 5 is a fragmentary vertical section taken on line 5—5 of Fig. 3.

The belt 20 serves not only to convey bundles toward the housing 10 but also to convey grain particles to a suitable grain particle collecting container 30. Thus the bottom surface of the belt 20 conveys grain particles forwardly of the preferably inclined bottom 12a of the pocket 11 to the screen or riddle 31 disposed at the forward portion of the pocket 11, the screen being provided with suitable perforations 32 as indicated in Figs. 7, 8 and 9. The grain particles may thus drop through the apertures in the screen 31 into a container 30 suitably supported on the members 33 and 34. The container may be conveniently formed of sheet metal and is preferably removable whereby the contents of the container may be emptied at intervals into, for example, a grain sack. It will be understood, of course, that the screen 31 and container 30 may be disposed adjacent any suitable portion of the bottom 12a. Thus, for example, it might be desired in certain cases, to incline the bottom 12a rearwardly and to dispose the screen 31 and container 30 adjacent the rearward end of the pocket 11.

The wheel 22 is mounted with its axis concentrically of the arcuate housing 10. The direction of rotation of the wheel 22 is such as to convey the bundles upwardly of the casing 10. Thus, referring to Fig. 3, the rotation of the wheel 22 would be counter-clockwise.

The non-rotating axle 35 of the wheel 22 is journaled in the rotatable wheel hubs 36 and 37 (Fig. 4). The hub 36 on the inner side of the wheel is in turn journaled in the bearing member 38 secured to the upstanding framework 17, the end of the axle 35 at the outer side of the wheel being journaled in the bearing portion 39 secured to the framework 17. The portion of the axle 35 intermediate its ends is shown as eccentrically offset to provide an axle portion 40 parallel to the axis of the wheel 22. The axle portion 40 may be retained in any suitable position such as rearwardly and downwardly of the axis of the wheel 22 by any suitable means, such as a pin 41 extending through the bearing portion 39 and the axle 35 adjacent the outer side of the wheel. The wheel 22 is provided with a cylindrical sheet metal rim 42 which is joined to the hollow hub members 36 and 37 by radial spokes 43. The rim 42 is shown as of substantially the same width as the housing 10 whereby any grain particles may be retained within the conveying mechanism and subsequently conveyed to the container 30. The wheel rim 42 is provided with a plurality of pairs of laterally and circumferentially spaced apertures 44 and 45. The rearwardly disposed of each pair of apertures is preferably adjacent the inner side of the wheel or the side of the wheel toward the shocker basket 8 for reasons to be later disclosed. Inwardly of and secured to the rim 42 and registering with the apertures 44 and 45 are the inwardly flaring tapered guide members 46 which are arranged to cooperate with the pins 23. The pins 23 are secured to the hub members 47 rotatably mounted upon the non-rotating axle portion 40 which, as previously disclosed, is eccentrically disposed with respect to the axis of the wheel 22. The function of the pins 23 is to cooperate with grain bundles conveyed to the housing 10 and to remain in cooperative relation with such bundles until, by reason of the rotation of the wheel 22, such bundles are conveyed to the discharge portion 15. As clearly shown in Fig. 3, the pins 23 are of such length, that at the lower portion of the housing 15, they extend through the guide members 46 and apertures 44 and 45 to within a short distance of the outer housing wall 12b. Due to the eccentric position of the axis of the pins 23, the pins are gradually retracted through the rim 42 during the rotation of the wheel 22 so that, when a bundle has been discharged from the discharge portion 15, the pins are released from contact with such grain bundles and are retained within the guide portions 46.

Figure 6:
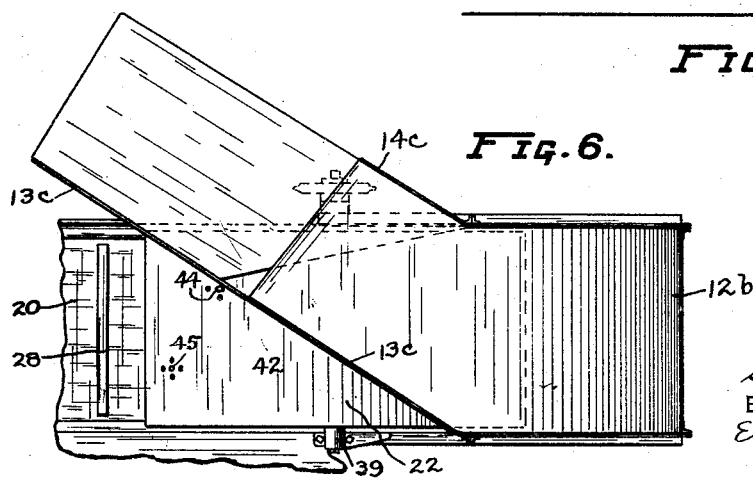
Fig. 6 is a fragmentary top plan view showing the discharge portion of the conveyor mechanism.
Figure 10:
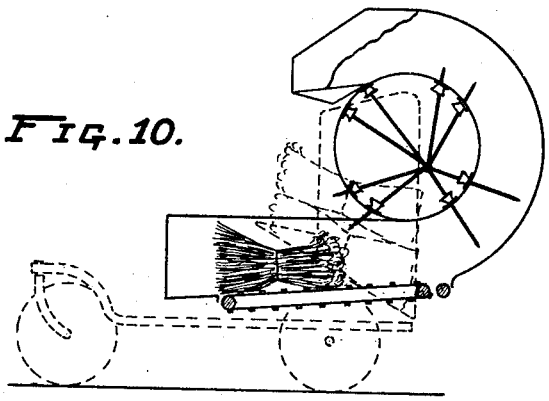
Figs. 10, 11, 12 and 13 are diagrammatic views illustrating the progress of a bundle of grain through my improved mechanism.
Figure 11:
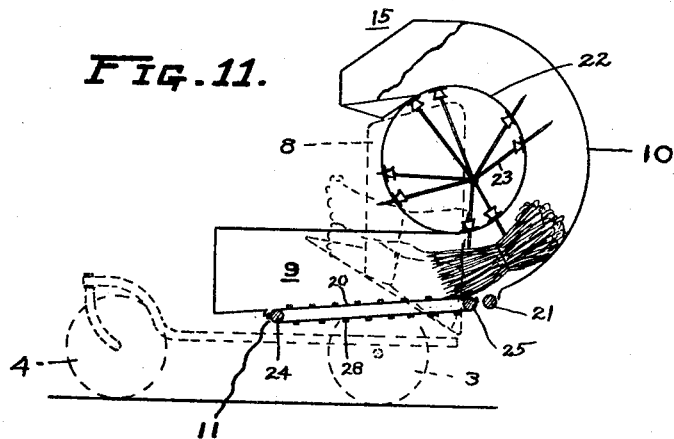
Figure 12:
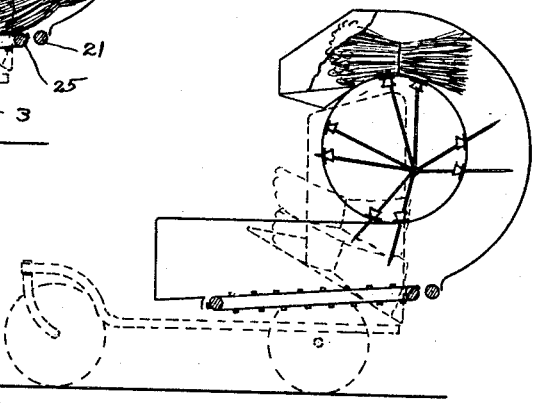
Figure 13:
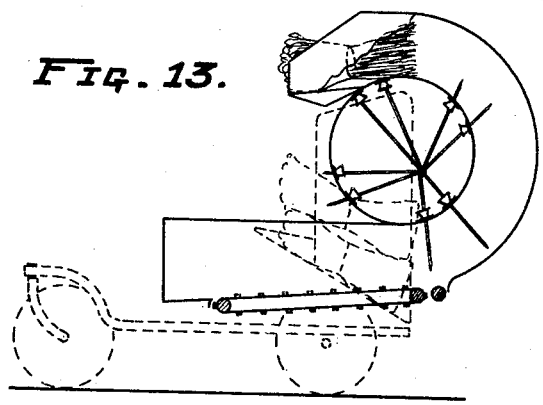

The pins 23 are arranged so that a pair thereof will cooperate with a grain bundle during the conveyance thereof. Due to the circumferential spacing of each pair of pins 23, the forwardly disposed pin is first released from contact with the bundle so that when the bundle is entering the discharge portion 15 such bundle may pivot on the rearward pin while being guided laterally, particularly by the wall 13c. (Fig. 6.) It will be readily understood that the lateral discharge of a bundle will be more readily accomplished when the bundle pivots on only one pin and when that pin is the one more remote from the pivoting agent, namely, the wall 13c.

As previously mentioned, the discharge portion 15 is arranged to discharge bundles laterally adjacent the top of the shocker basket 8. The outer wall 13c is preferably of greater length than the inner wall 14c and the bottom 16 of the discharge portion may be somewhat curved and shaped to conform to the shape of the wheel 22 at the top thereof, whereby a bundle will be readily transferred to said bottom portion. The forward end of the bottom 16 may be curved to dispose the bundle in a more convenient position for guidance into the shocker basket 8.

The conveyor belt 20 and the wheel 22 are driven during the travel of the machine over the ground from the rear axle 2. Thus a sprocket 48 associated with a suitable clutch mechanism 49 (Fig. 2) is disposed on the rear axle. To the hub member 36 is affixed a second sprocket 50. Pinions 51 and 52 are affixed to the rollers 21 and 25 exteriorly of the casing wall 14a, said pinions meshing with a large gear 53 mounted exteriorly of the wall 14a. On the shaft of the large gear 53 is affixed a sprocket 54. An idler sprocket 55 is secured to the adjustable arm 56. An endless chain 57 passes over the sprockets 48, 50, 54 and 55, whereby to drive the roller 25 and belt 20, the roller 21 and the wheel 22.

As is clearly disclosed in my hereinbefore mentioned patents, the shocker basket 8 is also operated by means associated with the axle 2. Thus, when the shocker basket is full of grain bundles, an operator standing upon the shocker platform 58 actuates the lever 59 whereby the gate 60 is caused to close the end of the shocker basket and the basket is automatically released and falls backward to the ground. As the shocker moves forward, the gate opens and the shock left standing on the ground. The basket is then automatically drawn forward and upward to its bundle receiving position on the shocker.

With my above described preferred form of shocker, the time required to close the gate, drop the basket, deliver the shock upon the ground, and return the basket again to bundle receiving position, is less than the time required for the binder to tie and deliver another bundle so that the shocker basket is always in position to receive bundles from my improved conveying mechanism.

In operation, grain bundles are delivered one at a time from an adjacent binder deck to the receptacle 9, the wall 14a, shelf 18 and rib 19 guiding the bundle on to the conveyor belt 20. When received from the binder, the butts of each bundle face forwardly. As shown in Figs. 10 to 13, the belt 20 and roller 21 advance each bundle to a position beneath the wheel 22 where the bundle is pierced by a pair of pins 23 and carried upwardly through the grain-tight housing 10 to the top of the wheel, where the bundle is released from the pins and delivered to the lateral discharge portion 15, each bundle at this point having its butt end facing to the rear of the machine. During this operation any grain particles will drop to the bottom of the housing 15 and be conveyed by the belt 20 to a receptacle 30. From the discharge portion 15 each bundle may be guided by an operator standing on the platform 58 into desired position in the shocker basket 8 with the butts of each bundle facing rearwardly so that, when the shocker basket is emptied, the butts of each bundle will rest on the ground.

It may be mentioned that the grain particles recovered in the receptacle 30 amount to a very appreciable quantity, saving to the farmer a great deal of grain which would otherwise be lost.

It will be seen that I have provided economical and advantageous means for receiving bundles from a binder deck, reversing such bundles end for end and delivering said bundles adjacent a shocker basket.

It will moreover be noted that my improved conveying means is readily adapted to convey bundles of any size or thickness.

It will also be seen that I have provided advantageous means for recovering large amounts of grain particles otherwise unrecovered during the passage of grain bundles from the binder to a shocker basket.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. In grain shocking apparatus, in combination, a grain bundle receiving receptacle, means in said receptacle for conveying bundles rearwardly, and means rearwardly of said receptacle for reversing grain bundles end for end and simultaneously conveying said bundles upwardly to adjacent the top of a shocker basket.

2. In grain shocking apparatus, in combination, a grain bundle receiving receptacle, a rotatable conveying wheel disposed adjacent the rearward end of said receptacle, a housing spaced from said wheel extending from the bottom of said wheel around the rear to the top thereof, means in said receptacle to convey grain bundles rearwardly to said wheel and housing, and means carried by said wheel to cooperate with said bundles, whereby said bundles may be conveyed upwardly through said housing during the rotation of said wheel.

3. In grain shocking apparatus, in combination, a grain bundle receiving receptacle, a rotatable conveying wheel disposed adjacent the rearward end of said receptacle, a housing spaced from said wheel extending from the bottom of said wheel around the rear to the top thereof, a belt conveyor in said receptacle to convey grain bundles rearwardly to said wheel and housing, and means carried by said wheel to cooperate with said bundles, whereby said bundles may be conveyed upwardly through said housing during the rotation of said wheel.

4. In grain shocking apparatus, in combination, a grain bundle receiving receptacle, a rotatable conveying wheel disposed adjacent the rearward end of said receptacle, a housing spaced from said wheel extending from the bottom of said wheel around the rear to the top thereof, means in said receptacle to convey grain bundles rearwardly to said wheel and housing, said means comprising a belt conveyor and a roller disposed rearwardly of said belt conveyor, and means carried by said wheel to cooperate with said bundles, whereby said bundles may be conveyed upwardly through said housing during the rotation of said wheel.

5. In grain shocking apparatus, in combination, a grain bundle receiving receptacle, a rotatable conveying wheel disposed adjacent the rearward end of said receptacle, a housing spaced from said wheel extending from the bottom of said wheel around the rear to the top thereof, means in said receptacle to convey grain bundles rearwardly to said wheel and housing, means carried by said wheel to cooperate with said bundles, whereby said bundles may be conveyed upwardly through said housing during the rotation of said wheel, and a container beneath said receptacle conveying means to receive grain particles, said receptacle conveying means being arranged to convey grain particles to said container.

6. In grain shocking apparatus, in combination, a grain bundle receiving receptacle, a rotatable conveying wheel disposed adjacent the rearward end of said receptacle, a housing spaced from said wheel extending from the bottom of said wheel around the rear to the top thereof, means in said receptacle to convey grain bundles rearwardly to said wheel and housing, means carried by said wheel to cooperate with said bundles, whereby said bundles may be conveyed upwardly through said housing during the rotation of said wheel, and a lateral discharge portion cooperating with the upper end of said housing, whereby grain bundles may be directed laterally of said housing upon discharge therefrom.

7. In grain shocking apparatus, in combination, a grain bundle receiving receptacle, means in said receptacle to convey grain bundles rearwardly, a rotatable conveying wheel disposed adjacent the rearward end of said receptacle, said wheel having a rim provided with spaced apertures, a housing spaced from said wheel extending from the bottom of said wheel around the rear to the top thereof, a fixed axle portion within said wheel disposed eccentrically with respect to the wheel axis, and pins rotatable about said axle portion, slidable through said rim apertures, and engageable with grain bundles during the conveyance thereof to the top of said wheel.

8. In grain shocking apparatus, in combination, a grain bundle receiving receptacle, means in said receptacle to convey grain bundles rearwardly, a rotatable conveying wheel disposed adjacent the rearward end of said receptacle, said wheel having a rim provided with spaced apertures, a housing spaced from said wheel extending from the bottom of said wheel around the rear to the top thereof, inwardly flared tapered guide members secured to said rim in alignment with said apertures, a fixed axle portion within said wheel disposed eccentrically with respect to the wheel axis, and pins rotatable about said axle portion, slidable through said guides and rim apertures, and engageable with grain bundles during the conveyance thereof to the top of said wheel.

9. In grain shocking apparatus, in combination, a grain bundle receiving receptacle, means in said receptacle to convey grain bundles rearwardly, a rotatable conveying wheel disposed adjacent the rearward end of said receptacle, said wheel having a rim provided with spaced apertures, a housing spaced from said wheel extending from the bottom of said wheel around the rear to the top thereof, a non-rotatable axle for said wheel having an eccentric axle portion disposed downwardly and rearwardly of the axis of said wheel, and pins rotatable about said eccentric axle portion and slidable through said rim apertures, said pins being thus arranged to engage with said grain bundles during the conveyance thereof from the bottom to the top of said wheel.

10. In grain shocking apparatus, in combination, a grain bundle receiving receptacle, means in said receptacle to convey grain bundles rearwardly, a rotatable conveying wheel disposed adjacent the rearward end of said receptacle, a housing spaced from said wheel extending from the bottom of said wheel around the rear to the top thereof, said wheel being arranged to rotate in a direction whereby grain bundles may be conveyed upwardly of said housing, a lateral discharge portion cooperating with the upper end of said housing, said discharge portion including a relatively long wall extending laterally of said housing toward an adjacent shocker basket, a rim on said wheel having a plurality of pairs of laterally and circumferentially spaced apertures, the rearwardly disposed of each pair of apertures being adjacent the side of said rim remote from said discharge portion wall, an axle portion within said wheel disposed downwardly and rearwardly of the wheel axis, pins rotatable about said axle portion and slidable through said rim apertures, whereby said bundles may be readily conveyed upwardly of said housing and guided laterally adjacent the top of said wheel.

11. In grain shocking apparatus, in combination, a substantially arcuate housing extending from a lower level to an upper level adjacent the top of a shocker basket, and means for moving grain bundles delivered endwise into the lower end of said housing upwardly through said housing, whereby said bundles may be delivered adjacent the top of said basket in reversed endwise position.

12. In grain shocking apparatus, in combination, a grain bundle receiving portion, an arcuate inwardly-opening trough-like housing disposed in substantially upstanding position, means for introducing grain bundles endwise from said grain bundle receiving portion into said housing, means arranged to cooperate with bundles within said housing to move said bundles upwardly therethrough, whereby said bundles may be delivered adjacent the top of said housing in reversed endwise position.

13. The method of transferring grain from a binder to a shocker basket which comprises moving grain bundles discharged from a binder deck rearwardly in endwise manner, moving said bundles upwardly and in a substantially vertical plane through an arc until said bundles are in longitudinally reversed position, and disposing said longitudinally reversed bundles in a shocker basket.

14. The method of transferring grain bundles from a lower level to an upper level adjacent the top of a shocker basket which comprises moving said grain bundles at said lower level in endwise manner, moving said bundles upwardly and in an arcuate path to said upper level, discharging said bundles at said upper level in longitudinally reversed position, and disposing said longitudinally reversed bundles in said shocker basket.

15. A grain conveyer element for use in conjunction with a traveling grain harvesting machine, said conveyor element being substantially U-shaped and having its open end directed forwardly in the direction of travel of the machine, and conveyor mechanism in said element for conveying the grain longitudinally of said element.

16. In grain shocking apparatus, bundle reversing mechanism comprising a generally U-shaped chute having means therein for advancing bundles longitudinally through the chute from end to end thereof so that the bundles, when delivered from the chute, will be turned end for end.

17. In grain handling apparatus, in combination, a generally U-shaped chute for the passage of grain, means therein for causing grain to pass through the chute, and means in connection with one of the arms of the chute for causing grain to be sent to the moving means in the chute.

18. In grain handling apparatus, in combination, a grain-receiving platform, means in connection with said platform for conveying grain as received, and a rotary drum cooperating with said conveying means in handling said grain, said drum removing the grain from the conveying means.

In testimony whereof I affix my signature.

GEORGE INNES.